United States Patent
Nicklos

[19]

[11] Patent Number: 5,930,074
[45] Date of Patent: Jul. 27, 1999

[54] SELF POSITIONING LEVER FOR OPENING THE SHUTTER OF A REMOVABLE DISK CARTRIDGE

[75] Inventor: Carl F. Nicklos, Ogden, Utah

[73] Assignee: Iomega Corporation, Roy, Utah

[21] Appl. No.: 08/866,167

[22] Filed: May 30, 1997

[51] Int. Cl.[6] .................................................. G11B 17/04
[52] U.S. Cl. ......................................................... 360/99.06
[58] Field of Search .................................. 369/75.1–75.2, 369/77.1–77.2; 360/99.02, 99.06, 99.12

[56] References Cited

U.S. PATENT DOCUMENTS

| | | | |
|---|---|---|---|
| 4,504,879 | 3/1985 | Toldi et al. ............................. | 360/105 |
| 4,663,677 | 5/1987 | Griffith et al. ........................... | 360/71 |
| 4,663,682 | 5/1987 | McNeil .................................. | 360/105 |
| 4,683,506 | 7/1987 | Toldi et al. ............................. | 360/105 |
| 4,722,012 | 1/1988 | Toldi et al. ............................. | 360/97 |
| 4,740,851 | 4/1988 | Jones et al. ............................. | 360/97 |
| 4,787,000 | 11/1988 | Schulze ................................. | 360/105 |
| 4,811,137 | 3/1989 | Muto et al. ............................. | 369/77.2 |
| 4,811,143 | 3/1989 | Ohashi et al. ........................... | 360/105 |
| 4,901,173 | 2/1990 | Jones et al. ........................... | 360/99.04 |
| 4,965,685 | 10/1990 | Thompson et al. ................. | 360/97.01 |
| 5,005,092 | 4/1991 | Shigenai et al. ..................... | 360/99.06 |
| 5,027,241 | 6/1991 | Hatch et al. ............................ | 360/105 |
| 5,163,038 | 11/1992 | Arai ...................................... | 369/77.2 |
| 5,291,359 | 3/1994 | Wolter .................................... | 360/104 |
| 5,508,864 | 4/1996 | Briggs et al. .......................... | 360/106 |
| 5,530,607 | 6/1996 | Spendlove ............................. | 360/105 |

*Primary Examiner*—Allen T. Cao
*Attorney, Agent, or Firm*—Woodcock Washburn Kurtz Mackiewicz & Norris LLP

[57] ABSTRACT

A shutter lever for opening the shutter of a removable disk cartridge upon insertion of the cartridge into a disk drive, has a pre-positioning feature that pre-positions the lever to ensure accurate engagement of the lever with the shutter of the disk cartridge, despite variations in the initial location of the lever that may arise, for example, due to varying tolerances on the lever stop and/or its pivot point.

12 Claims, 6 Drawing Sheets

SELF POSITIONING LEVER FOR OPENING THE SHUTTER OF A REMOVABLE DISK CARTRIDGE

RELATED APPLICATIONS

The present application is related to the following patent applications, all of which are hereby incorporated by reference in their entirety:

Ser. No. 08/866,189, filed on May 30, 1997, entitled "An Improved Operating System For Operating An Eject System And A Head Retraction System Of A Disk Drive" (Attorney Docket No. 9460)

Ser. No. 08/881,804, filed on May 30, 1997, entitled "Media Capture to Prevent Head Damage In A Removable Cartridge Disk Drive" (Attorney Docket No. 9463)

Ser. No. 08/866,225, filed on May 30, 1997, entitled "An Improved Head Retraction System for Retracting The Heads Of A Disk Drive" (Attorney Docket No. 9464)

Ser. No. 08/881,803, filed on May 30, 1997, entitled "Steering Magnets To Reduce Magnetic Leakage Flux In A Disk Drive" (Attorney Docket No. 9507)

Ser. No. 08/881,805, filed on May 30, 1997, entitled "Laminated Steel Return Path With Actuator Support Features" (Attorney Docket No. 9508)

Ser. No. 08/866,190, filed on May 30, 1997, entitled "Dual Loop Flex Circuit For A Linear Actuator" (Attorney Docket No. 9509)

Ser. No. 08/872,172, filed on May 30, 1997, entitled "Interlocking Carriage Assembly For Linear Actuator" (Attorney Docket No. 9511)

Ser. No. 08/881,806, filed on May 30, 1997, entitled "Head Gimbal Protection For A Disk Drive" (Attorney Docket No. 9512)

Ser. No. 08/866,168, filed on May 30, 1997, entitled "Flexured Mounting System For Friction Reduction And Friction Linearization In Linear Actuator For Disk Drive" (Attorney Docket No. IOM-9514)

Ser. No. 08/881,807, filed on May 30, 1997, entitled "Return Path Geometry to Enhance Uniformity Of Force On A Linear Actuator" (Attorney Docket No. 9516)

Ser. No. 08/886,181, filed on May 30, 1997, entitled "In-Rigger For A Linear Actuator Carriage Assembly" (Attorney Docket No. 9517)

Ser. No. 08/866,171, filed on May 30, 1997, entitled "Integral Lift Wing For A Disk Drive Actuator" (Attorney Docket No. 9518)

Ser. No. 08/866,227, filed on May 30, 1997, entitled "Head Protection In A Disk Drive" (Attorney Docket No. 9519)

Ser. No. 08/866,177, filed on May 30, 1997, entitled "Motor Loading System For A Disk Drive" (Attorney Docket No. 9526)

Ser. No. 08/866,226, filed on May 30, 1997, entitled "An Improved Eject System For Ejecting A Disk Cartridge From A Disk Drive" (Attorney Docket No. 9527)

Ser. No. 08/881,808, filed on May 30, 1997, entitled "Cover For A Disk Drive" (Attorney Docket No. 9547)

BACKGROUND

1. Field of the Invention

The present invention relates to computer storage devices, such as disk drives, and, more particularly, to a self-positioning lever for opening the shutter of a removable disk cartridge upon insertion of the cartridge into the disk drive.

2. Description of the Prior Art

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side by a shutter lever, during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems. The present invention addresses and overcomes one such problem.

In particular, because of the length constraints in designing a version of the ZIP™ drive for use in laptop and notebook computers, a majority of the drive chassis is occupied by the disk cartridge once it is inserted, leaving a relatively small amount of room on the chassis for other components, including the shutter lever that moves the shutter of the disk cartridge to the side during insertion, and more particularly, any form of stop that is used to position the shutter lever for proper engagement with the cartridge shutter upon initial insertion of the cartridge into the disk drive. Because space is limited, any such stop has to be located relatively close to the pivot point of the shutter lever. With a stop spaced close to the pivot point of the shutter lever, small variations in the location of the stop cause large variations in the location of the end of the lever that must engage the cartridge. If the shutter is opened too far, the tip of the lever will contact the cartridge outside of the desired capture pocket and will "jump" over that pocket, thus missing the engagement surface of the shutter completely. If the shutter is not opened far enough, the lever may again miss the capture pocket. Because of this problem, there is a need to ensure that the shutter lever is accurately positioned to engage the shutter, irrespective of the variations in initial shutter position that may result due to varying tolerances on the lever stop and pivot point. The present invention satisfies this need.

SUMMARY OF THE INVENTION

The present invention is directed to a shutter lever for opening the shutter of a removable disk cartridge upon insertion of the cartridge into a disk drive. According to the present invention, the shutter lever has a pre-positioning feature that pre-positions the lever to ensure accurate engagement of the lever with the shutter of the disk cartridge, despite variations in the initial location of the lever that may arise, for example, due to varying tolerances on the lever stop and/or its pivot point. In a preferred embodiment, the shutter lever comprises an arm pivotally mounted to a chassis of the disk drive. The arm has a first abutment surface at the distal end of the arm that engages the front edge of the cartridge during insertion into the drive, and a second abutment surface that is adapted to engage a surface of the cartridge shutter. The first abutment surface is disposed relative to the second abutment surface, such that when the cartridge initially engages the first abutment surface upon insertion into the disk drive, the arm moves to pre-position the second abutment surface for accurate engagement with the abutment surface of the cartridge shutter. In this manner, proper engagement of the second abutment surface of the arm with the abutment surface of the shutter is assured, irrespective of the initial position of the arm (which can vary due to tolerances on the lever stop and/or pivot point).

These and other features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
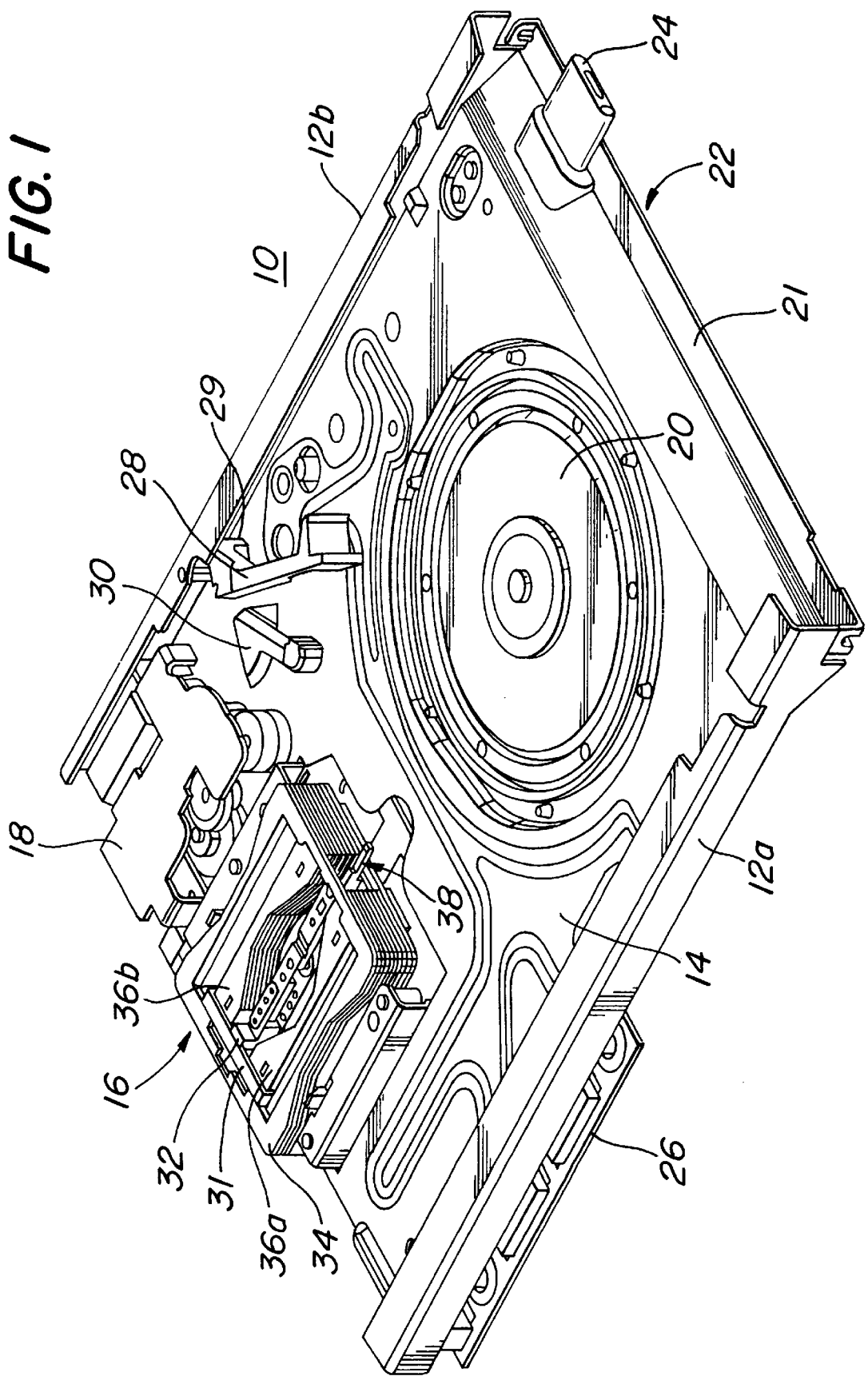
FIG. 1 shows an exemplary disk drive in which the features of the present invention may be employed.

Referring to the drawings wherein like numerals indicate like elements throughout, there is shown in FIG. 1 an exemplary disk drive 10 in which the present invention may be employed. The disk drive 10 comprises a chassis 14 having u-shaped outer edges that form opposed guide rails 12a, 12b that guide a removable disk cartridge (not shown) into the disk drive through opening 22. A door 21 covers the opening 22 when the disk drive is not in use. In the present embodiment, the chassis is metallic. A thin metal top cover (not shown) of the disk drive 10 has been removed so that the internal components of the drive are visible.

An eject lever 30 is rotatably mounted on the chassis 14. The eject lever 30 is shown in FIG. 1 in the position that it occupies when there is no disk cartridge in the drive. During cartridge insertion, the eject lever 30 moves from the position shown in FIG. 1 to a rearward, or cocked position. In that cocked position, the eject lever 30 is under spring tension. When it is desired to eject the disk cartridge from the drive 10, an eject button 24 is pushed. Among other things, this causes the eject lever 30 to be released from its cocked position, so that it springs forward, back to the position shown in FIG. 1, in order to force the disk cartridge backwardly out of the disk drive.

In accordance with the present invention, the disk drive further comprises a shutter lever 28 pivotally mounted on the chassis. Like the eject lever 30, the shutter lever 28 is shown in FIG. 1 in the position that it occupies when there is no disk cartridge in the drive. As described more fully below, during cartridge insertion, the shutter lever swings from the position shown in FIG. 1 to a rearward position. During this movement, an abutment surface on the shutter lever 28 engages a shutter of the disk cartridge and moves the shutter to the side, exposing a head access opening in the front peripheral edge of the cartridge. A stop 29 is formed on the shutter lever close to its pivot point. The stop 29 contacts the side of the guide rail 12b to position the lever for initial engagement with the disk cartridge. A spring (not shown) is attached to the shutter lever at its pivot point to bias the lever toward the opening 22 of the disk drive, into the position shown in FIG. 1. In the present embodiment, the shutter lever 28 is formed of a thermoplastic material.

The disk drive 10 also has a linear actuator 16 disposed at the rear of the chassis 14. The linear actuator 16 comprises a voice coil motor including a coil 31 mounted on a carriage assembly 32, an outer magnet return path assembly 34, and two inner return path members 36a, 36b on opposite sides of the carriage assembly 32. After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 2:
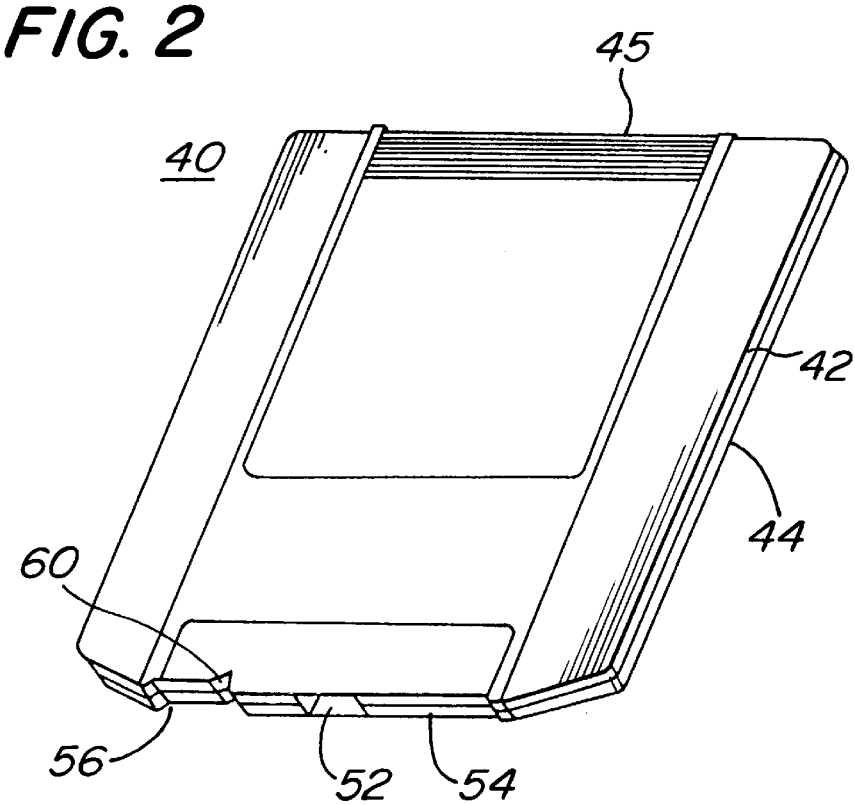
FIGS. 2 and 3 are top and bottom views, respectively, of a removable disk cartridge that may be inserted into the disk drive of FIG. 1.
Figure 3:
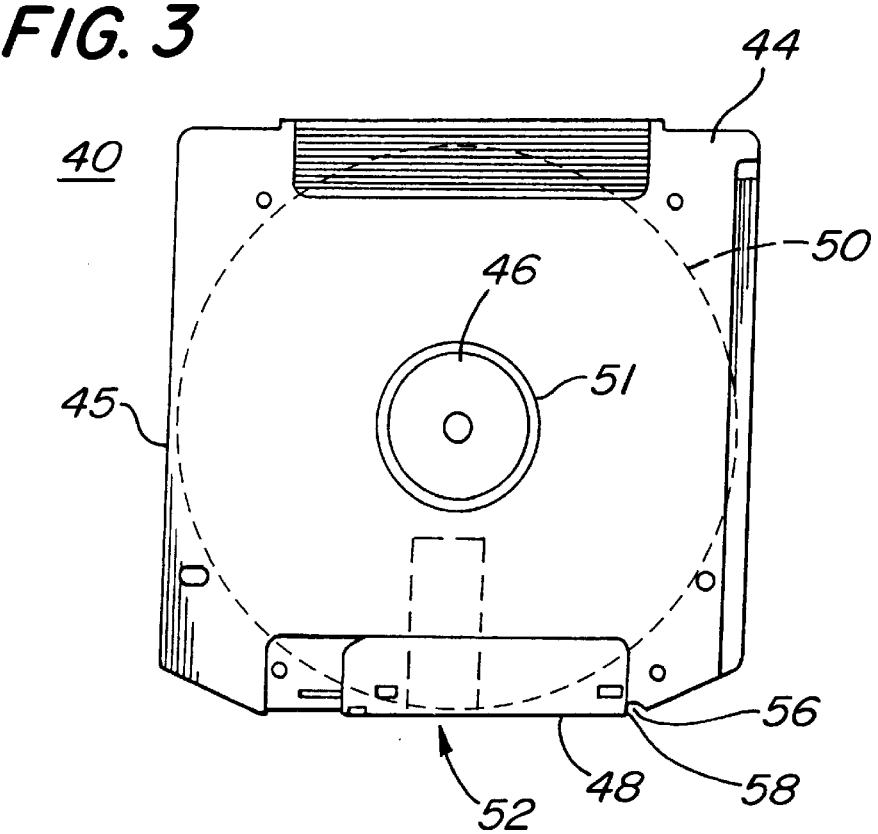

FIGS. 2 and 3 show top and bottom views, respectively, of a removable disk cartridge 40 that can be inserted into the disk drive 10 of FIG. 1. The cartridge shutter 48 is removed in FIG. 2 to show features otherwise hidden by the shutter. In the present embodiment, the removable disk cartridge 40 comprises a ZIP™ disk available from Iomega Corporation, assignee of the present invention. However, the present embodiment is not limited to use with these disk cartridges, and can be used with a variety of other disk cartridges, including, for example, standard 3.5" floppy disk cartridges.

As shown in FIGS. 2 and 3, the disk cartridge 40 has upper and lower shells 42, 44 that mate to form an outer casing 45. In a preferred embodiment, the shells 42, 44 are plastic. A hub 46 is rotatably mounted in the casing 45. A disk-shaped storage medium 50 is affixed to the hub 46. In a preferred embodiment, the storage medium 50 is a flexible, magnetic storage medium. However, in other embodiments, the storage medium may be a rigid magnetic disk, a magneto-optical disk or an optical storage medium. An opening 51 in the lower shell 44 of the casing 45 provides access to the disk hub 46. A head access opening 52 in the front peripheral edge 54 of the casing 45 provides access to the surfaces of the storage medium 50 for the read/write heads 38 of the disk drive 10.

As best shown in FIG. 3, a shutter 48 is slidably mounted on the front edge of the disk cartridge 40 to cover the head access opening 52 when the cartridge 40 is not in use. When the disk cartridge 40 is inserted into the disk drive 10, the shutter 48 is moved to the side by the shutter lever 28 to expose the head access opening 52. A cut-out 56 in the front peripheral edge 54 of the disk cartridge 40 serves as a capture pocket for an abutment surface of the shutter lever 28, to facilitate engagement of that abutment surface with a mating abutment surface 58 on the edge of the shutter 48. A second, deeper cutout 60 is occupied by the distal end of the shutter lever 28 once the cartridge has been fully inserted.

Figure 4:
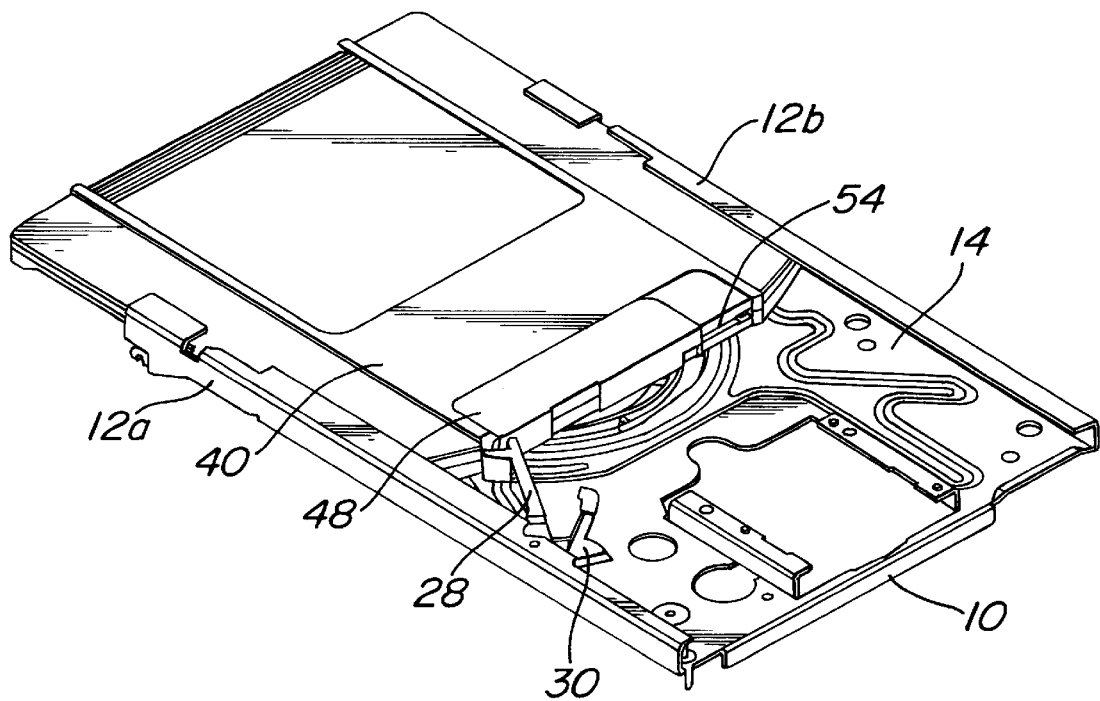
FIG. 4 is a rearward view of the disk drive of FIG. 1, showing a disk cartridge partially inserted in the drive to the point at which the front edge of the cartridge approaches the shutter lever.

FIG. 4 shows the disk cartridge 40 of FIGS. 2 and 3, partially inserted into the disk drive 10 of FIG. 1. Certain components of the disk drive 10, such as the actuator 16, gear train mechanism 18, and circuit board 26 have been removed for illustration purposes only. As shown in FIG. 4, the disk cartridge 40 has been inserted into the drive 10 to the point at which the cartridge is about to engage the shutter lever 28. The cartridge 40 is guided into the disk drive 10 by the u-shaped guide rails 12a, 12b on opposite sides of the chassis 14.

Figure 5:
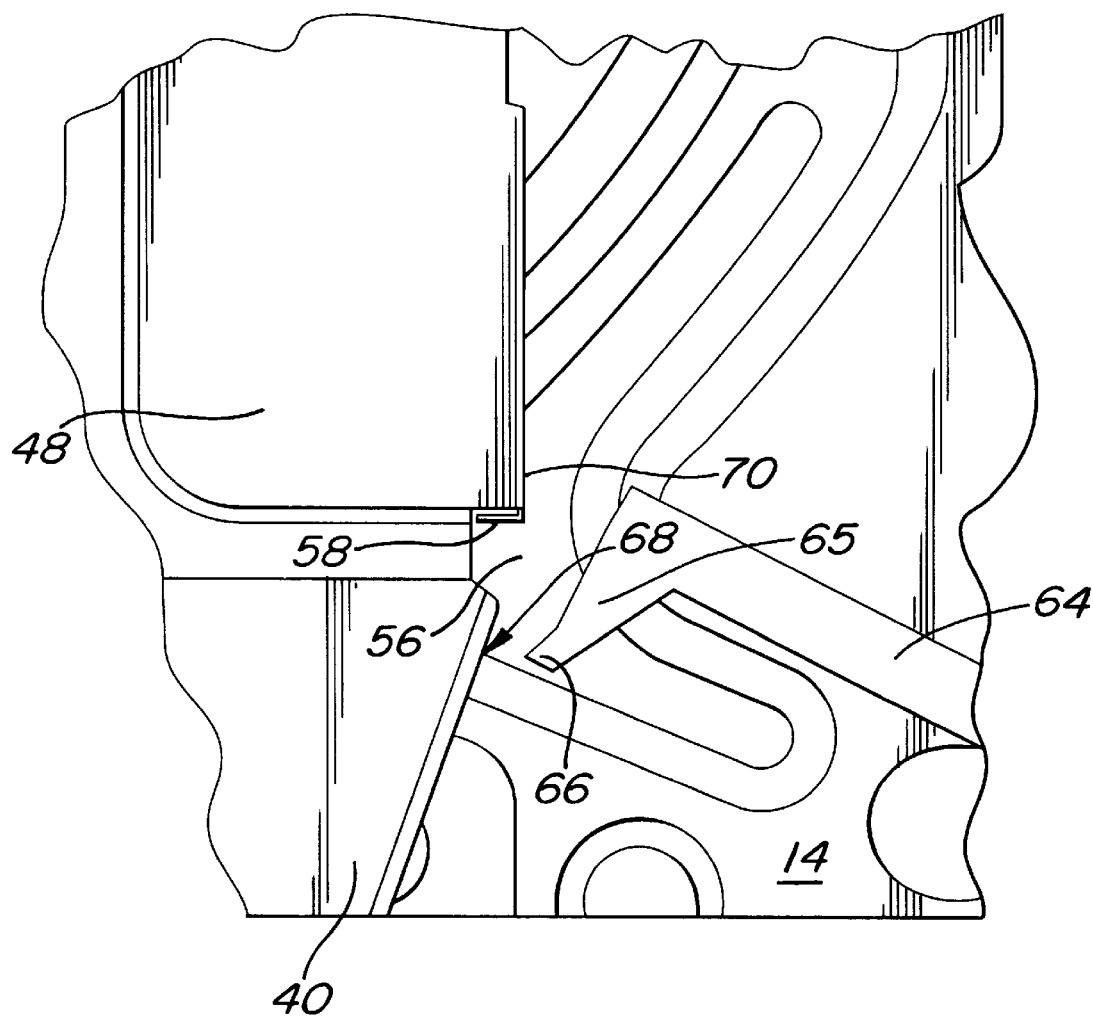
FIG. 5 is an enlarged view of a prior art shutter lever that does not have the self-positioning feature of the present invention, illustrating the problem that the present invention overcomes.

FIG. 5 shows a prior art shutter lever 64, and illustrates the problem that the present invention overcomes. The prior art shutter lever 64 is pivotally mounted to the chassis 14 at its proximal end (not shown). The prior art lever has a hook 65 at its distal end, with an abutment surface 66 at the far end of the hook 65. In the example shown, tolerances on the positioning of the lever stop (not shown) and pivot point (not shown) have caused the shutter lever 64 to be "opened" too far in its initial position, so that the abutment surface 66 on the hook 65 is not positioned to enter the capture pocket 56 of the disk cartridge in order to engage the mating surface 58 of the cartridge shutter 48. Instead, because of this positioning error, the abutment surface 66 of the shutter lever 64 will contact the front edge of the cartridge at point 68. In some cases, the lever 64 may rotate so that the abutment surface 66 does enter the capture pocket and proceed to function normally. In other instances, particularly if the cartridge is inserted rapidly into the disk drive 10, the abutment surface may "ski jump" off the front edge of the disk cartridge and pass over the capture pocket, landing on the front edge of the shutter 48 at, for example, point 70. In this case, as the cartridge continues to move into the disk drive, the abutment surface 66 of the lever 64 will simply slide ineffectively across the front of the shutter, without opening the shutter 48. In other drives, the tolerances on the lever stop and pivot point might be such that the lever is initially positioned such that the abutment surface 66 will first contact the shutter 48 on its front edge at point 70. Again, the lever 64 will be ineffective in opening the shutter in such a case. It is these problems that the present invention overcomes.

Figure 6:
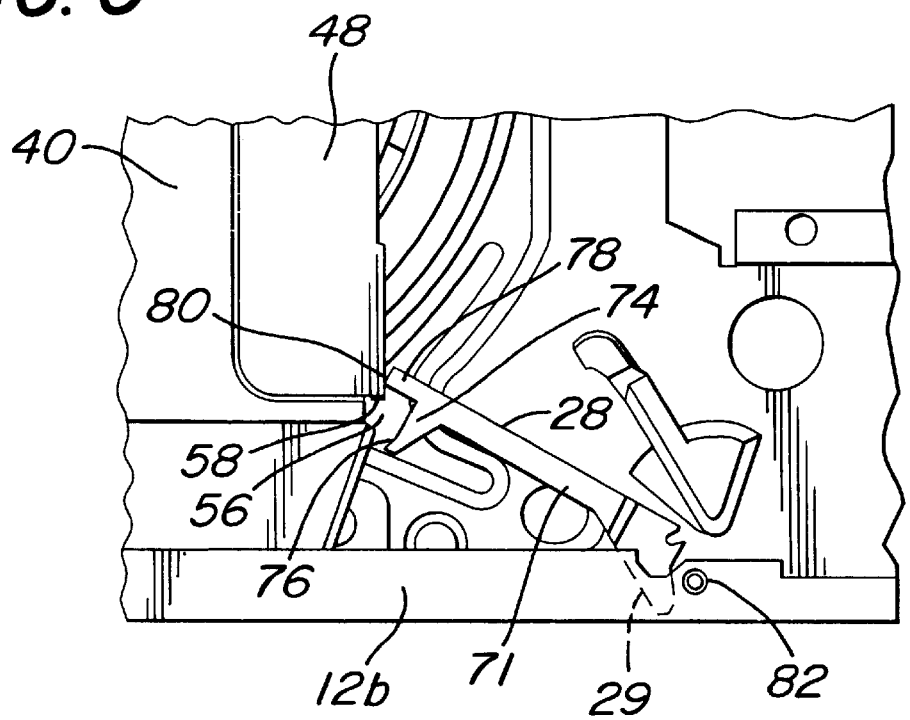
FIGS. 6–9 show a shutter lever in accordance with a preferred embodiment of the present invention, and illustrate a sequence of operation of the shutter lever.

FIGS. 6–9 illustrate a preferred embodiment of a shutter lever 28 in accordance with the present invention, and also illustrate a sequence of operation of the shutter lever 28. Referring to FIG. 6, which shows the shutter lever 28 in its initial position, the shutter lever 28 of the present invention comprises an arm 71 pivotally mounted at its proximal end to the chassis 14 of the disk drive 10. The arm 71 of the lever 28 pivots about pivot point 82. A projection 29 near the pivot point 82 of the arm 71, engages the side of the u-shaped guide rail 12b of the disk drive 10 to operate as a stop. A spring (not shown) biases the lever such that the projection 29 is biased against the edge of the guide rail 12b, i.e., the lever 28 is biased toward the disk cartridge 40.

According to the present invention, the arm 71 of the shutter lever 28 has a projection 78 extending from its distal end, that provides a first abutment surface 80. A hook 74 is also formed at the distal end of the arm 71. The hook 74 provides a second abutment surface 76.

Figure 7:
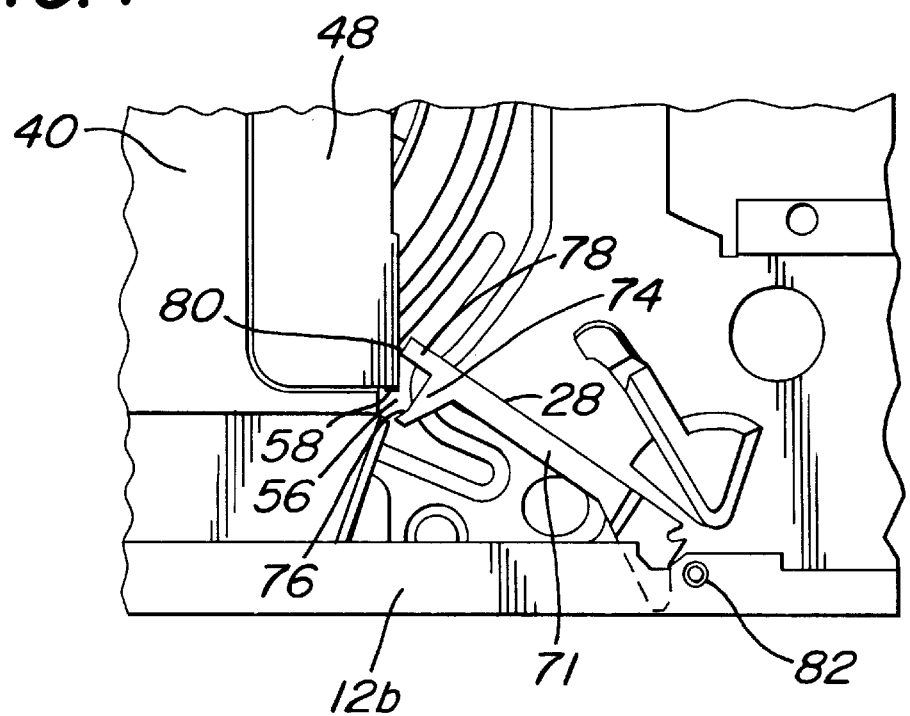
Figure 8:
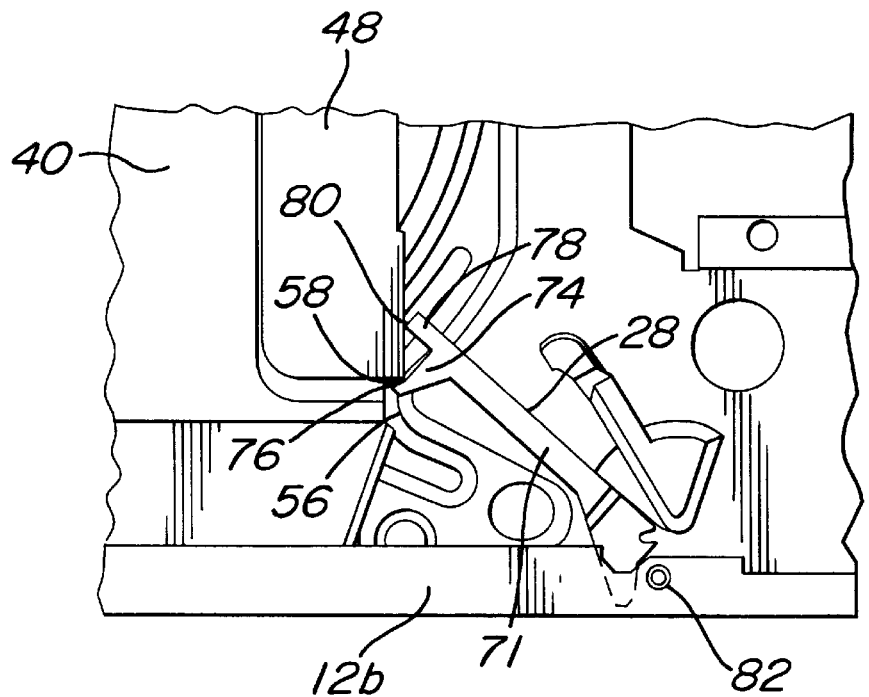
Figure 9:
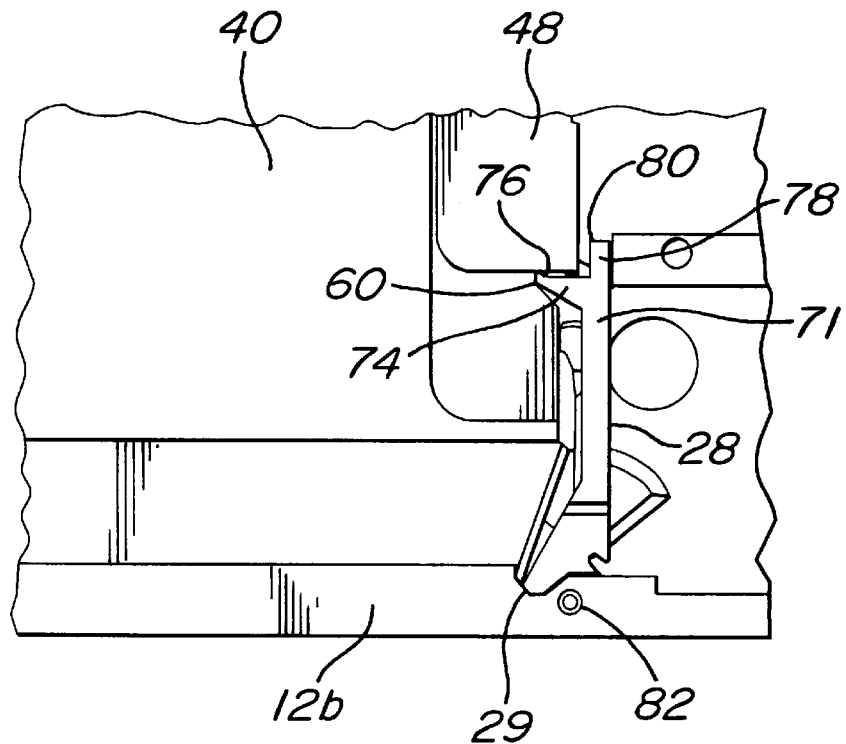

Referring to FIG. 6, as a disk cartridge 40 is inserted into the disk drive, the first abutment surface 80 of the projection 78 contacts the front edge of the disk cartridge, prior to the second abutment surface 76 of the hook 74 contacting the cartridge. As the sequence of FIGS. 6, 7, and 8 show, continued insertion of the disk cartridge causes the first abutment surface 80 of the projection 78 to slide across the front face of the cartridge shutter 48, such that the second abutment surface of the hook 74 gets aligned with the capture pocket 56 on the disk cartridge 40 (FIG. 8). This ensures that the second abutment surface 76 will properly contact the mating abutment surface 58 on the shutter 48, so that the shutter 48 is properly moved to the side to an open position when the cartridge 40 is fully inserted, as shown in FIG. 9. Thus, the sliding movement of the first abutment surface 80 over the front face of the shutter 48, pre-positions the second abutment surface of the shutter lever 28 for accurate engagement with the abutment surface 58 of the cartridge shutter 48. In this manner, proper engagement of the second abutment surface 76 of the shutter lever 28 with the mating surface 58 of the cartridge shutter 48 is assured, irrespective of minor deviations in the initial position of the arm 71 from disk drive to disk drive (which can vary due to tolerances on the lever stop 29 and/or at the pivot point 82).

As the foregoing illustrates, the present invention is directed to a self-positioning lever for opening the shutter of a removable disk cartridge upon insertion of the cartridge into the disk drive. It is understood that changes may be made to the embodiments described above without departing from the broad inventive concepts thereof. Accordingly, the present invention is not limited to the particular embodiment disclosed, but is intended to cover all modifications that are within the spirit and scope of the invention as defined by the appended claims.

What is claimed is:

1. A shutter lever for opening a shutter of a removable disk cartridge upon insertion of the cartridge into a disk drive, said shutter lever comprising:

an arm for pivotally mounting to a chassis of the disk drive;

a first abutment surface formed on a distal end of the arm, said first abutment surface being for slidably engaging a front edge of the disk cartridge upon insertion of the disk cartridge into the drive;

a second abutment surface, formed on a first projection extending from the arm, for engaging a surface of the shutter of the disk cartridge in order to move the shutter to an open position, the first abutment surface being disposed relative to the second abutment surface, such that sliding engagement of the first abutment surface with the front edge of the cartridge pre-positions the second abutment surface for accurate engagement with the surface of the shutter of the disk cartridge; and a second projection extending from the arm, the second projection being for engaging a guide rail of the disk drive to limit the movement of the shutter lever when the disk cartridge is ejected from the disk drive.

2. A shutter lever for opening a shutter of a removable disk cartridge upon insertion of the cartridge into a disk drive, said shutter lever comprising:

an arm for pivotally mounting to a chassis of the disk drive;

a first abutment surface formed on a first end of the arm, said first abutment surface being for engaging a front edge of the disk cartridge upon insertion of the disk cartridge into the drive;

a second abutment surface, formed on a first projection extending from the arm, for engaging a surface of the shutter of the disk cartridge in order to move the shutter to an open position; and a second projection extending from a second end of the arm, the second projection being for engaging a side of the disk drive to limit the movement of the shutter lever when the disk cartridge is ejected from the disk drive.

3. A disk drive for interfacing with a disk cartridge having a storage medium, comprising:

a chassis having a side;

a shutter lever rotatably mounted to the chassis, comprising:

(i) a first surface, formed at a distal end of the shutter lever, the first surface being for slidably engaging a front edge of the disk cartridge upon insertion of the disk cartridge into the disk drive;

(ii) a second surface, formed on a first projection extending from the lever, for slidably engaging a surface of a shutter of the disk cartridge in order to move the shutter to an open position, the first surface being disposed on the shutter lever relative to the second surface such that sliding engagement of the first surface with the front edge of the cartridge pre-positions the second surface for engagement with the surface of the shutter of the disk cartridge; and (iii) a second projection for limiting rotation of the shutter lever by engaging the side of the chassis when the disk cartridge is ejected from the disk drive.

4. The disk drive of claim 3, wherein the side of the chassis comprises a guide rail.

5. The disk drive of claim 4, wherein the guide rail comprises a u-shaped rail.

6. A method of positioning a shutter of a disk cartridge in a disk drive, comprising:

providing a disk drive with a shutter lever rotatable mounted to the disk drive, the shutter lever having a second projection extending from the shutter lever that rests against a side of the disk drive to hold the shutter lever in a receiving position for receiving the disk cartridge;

inserting the disk cartridge into the disk drive so that a first surface of the shutter contacts a distal end of the shutter lever and rotates the shutter lever away from the receiving position;

pushing the disk cartridge further into the disk drive so that the shutter lever rotates away from the receiving position and the distal end of the shutter lever slides across the first surface of the shutter and a first projection extending from the shutter lever engages a second surface of the shutter; and inserting the disk cartridge further into the disk drive so that the shutter lever rotates and the first projection pushes the second surface of the shutter to move the shutter to an open position.

7. The method of claim 6, wherein the distal end of the shutter lever does not contact the first surface of the shutter when the shutter is in the open position.

8. The method of claim 6, wherein the distal end of the shutter lever comprises an abutment surface for contacting the first surface of the shutter.

9. The method of claim 6, wherein the first projection comprises an abutment surface for contacting the second surface of the shutter.

10. The method of claim 6, wherein the first projection enters an aperture defined in the disk cartridge when the shutter is in the open position.

11. The method of claim 6, wherein the shutter lever further comprises a second projection extending from the shutter lever.

12. The method of claim 11, wherein the side of the disk drive comprises a guide rail for receiving the disk cartridge and the second projection rests against the guide rail when the shutter is in the receiving position.

* * * * *